United States Patent [19]

Kroger et al.

[11] 4,387,908
[45] Jun. 14, 1983

[54] TROTTER EXERCISING CART

[76] Inventors: Tapani Kroger, 79899 Liukonpelto; Raimo Luostarinen, 79330 Naadanmaa, both of Leppavirta, Finland

[21] Appl. No.: 259,405

[22] Filed: May 1, 1981

[51] Int. Cl.³ .............................................. B62C 1/08
[52] U.S. Cl. ...................................... 280/63; 119/29; 188/294; 280/5 F
[58] Field of Search ...................... 280/63, 66, 70, 72, 280/73, 75, 5 F, 5 A; 272/73, 130; 188/290, 292, 294; 54/39; 119/29

[56] References Cited

U.S. PATENT DOCUMENTS

| 2,892,514 | 6/1959 | Gaines et al. | 280/63 |
| 3,062,548 | 11/1962 | Foster et al. | 272/130 |
| 3,498,420 | 3/1970 | Fawick | 188/292 |
| 4,033,598 | 7/1977 | King | 280/63 |
| 4,322,086 | 3/1982 | Bennink | 280/5 A |

FOREIGN PATENT DOCUMENTS 142286  8/1948  Australia ............................. 260/63

Primary Examiner—David M. Mitchell
Attorney, Agent, or Firm—Townsend and Townsend

[57] ABSTRACT

A continuously adjustable braking system for a trotter exercising cart. Hydraulic pumps are connected to the wheels of the cart, and wheel rotation causes the pumps to pump oil from a reservoir through pipes and an adjustable valve and back to the reservoir. The valve can be adjusted by the driver while the cart is moving to provide the desired degree of resistance to oil flow and hence of braking force.

1 Claim, 2 Drawing Figures

TROTTER EXERCISING CART

BACKGROUND OF THE INVENTION

1. Field of the Invention

The present invention relates to a horse training cart or sulky, and specifically to an adjustable hydraulic brake system for such a cart.

2. Prior Art

In training a horse for sulky racing it is sometimes desirable to have the horse pull a heavier load than a sulky. Weighted sledges have been used, but adjusting the drag of a moving sledge is difficult, and due to their dissimilar designs sledges are an awkward substitute for racing sulkies. Another prior art technique, taught by U.S. Pat. No. 2,892,514, provides a friction brake for sulky wheels. The prior art brake system applies a constant drag which can be changed only by stopping the sulky, disassembling the brake, and substituting different brake springs. There is a step difference between the braking force applied by different springs; continuous adjustment to degrees of braking between the spring sizes is not available. The brakes wear out and must be periodically replaced. There is, therefore, a need for a trotter exercise cart brake system which can be adjusted over a continuous range, while moving, which will not require brake shoe replacement, and which is otherwise operationally similar to a racing sulky.

SUMMARY OF THE INVENTION

The object of the present invention is to provide a trotter exercising cart having a brake system adjustable over a continuous range while the cart is moving. This is achieved by a hydraulic pump system which uses energy from the turning wheels to circulate oil through pipes and a driver-adjustable valve.

DESCRIPTION OF THE PREFERRED EMBODIMENT

Figure 1:
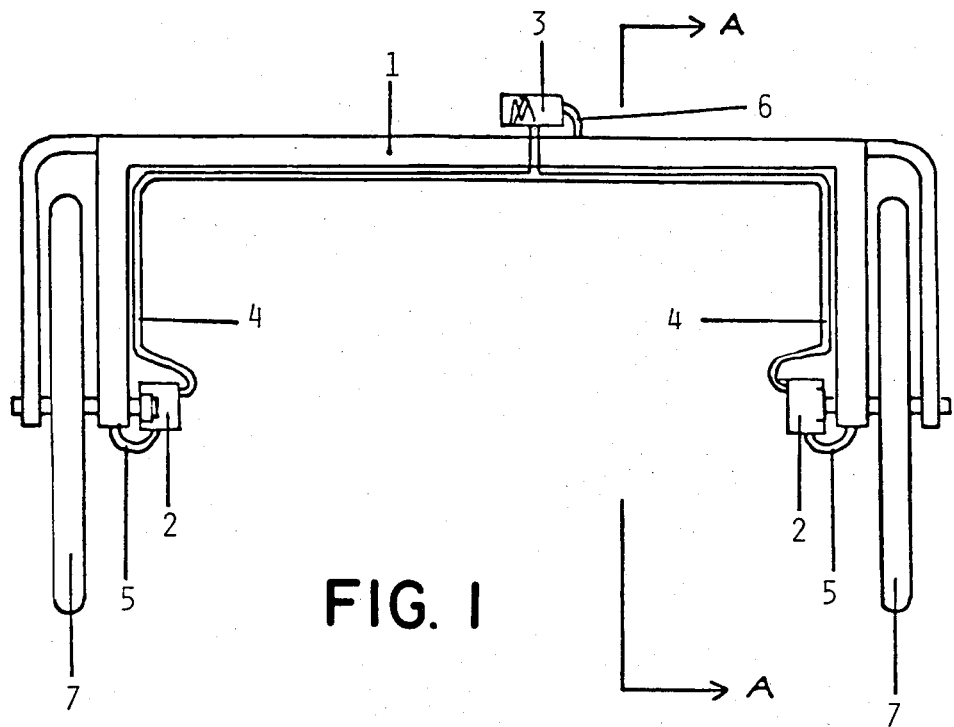
FIG. 1 is a rear view of an exercise cart according to the present invention.
Figure 2:
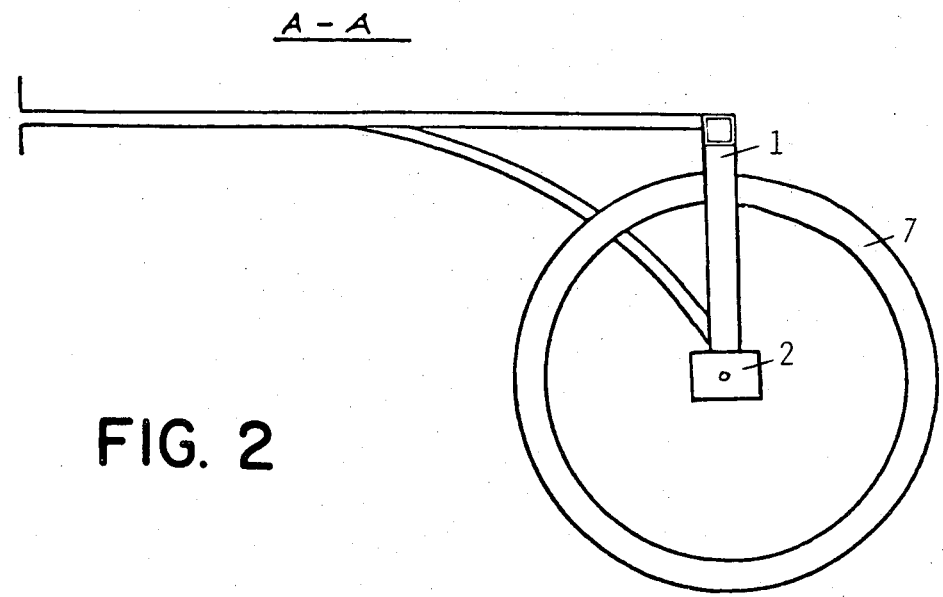
FIG. 2 is a cross section taken along line A—A of FIG. 1 and showing a side view of the frame, one wheel, and one pump.

The trotting cart has a hollow closed tubular frame 1 which serves as an oil reservoir having a capacity of preferably two to four liters of oil. A hydraulic pump 2 is fixedly attached to frame 1 at each wheel 7 in line with the wheel axle. When the cart is rolling, the rotating axles turn their respective pumps. Oil is drawn from reservoir 1 through supply pipes 5 to the pumps 2. The pumps force the oil into pressure pipes 4 and through adjustable valve 3. Valve 3 is preferably near the seat so that the driver can adjust the valve while the cart is moving. The area of the valve opening determines the coefficient of hydraulic friction working against the oil flow, the pump operation, and the wheels' turning. From valve 3, oil returns by return pipe 6 to reservoir 1. The hydraulic valve allows braking force to be adjusted by degrees rather than in steps as in prior sulky brakes. Adjustment of braking force by degrees allows training to be more closely tailored to a horse's condition. Use of the cart frame as a reservoir provides good dispersion of the heat energy imparted to the oil by braking.

A preferred embodiment has been illustrated, of which modifications and adaptations within the scope of the invention will occur to those skilled in the art. The invention is limited only by the scope of the following claims.

We claim:

1. A trotter exercising cart braking system comprising:
   an oil-tight hollow cart frame;
   a pair of cart wheels having axles rotatably attached to said frame;
   a pair of hydraulic pumps fixedly attached to said frame and operably connected to a respective axle;
   a pair of supply pipes connected between respective pumps and said frame;
   an adjustable hydraulic valve;
   a pressure pipe connected between said pumps and said valve; and
   a return pipe connected between said valve and said frame, whereby oil circulating through said system presents a resistance to said wheels turning, depending on the adjustment of said valve.

* * * * *